T. B. DIXON.
TELEGRAPHY.
APPLICATION FILED JULY 5, 1904. RENEWED JULY 9, 1907.
922,462.
Patented May 25, 1909.
9 SHEETS—SHEET 5.
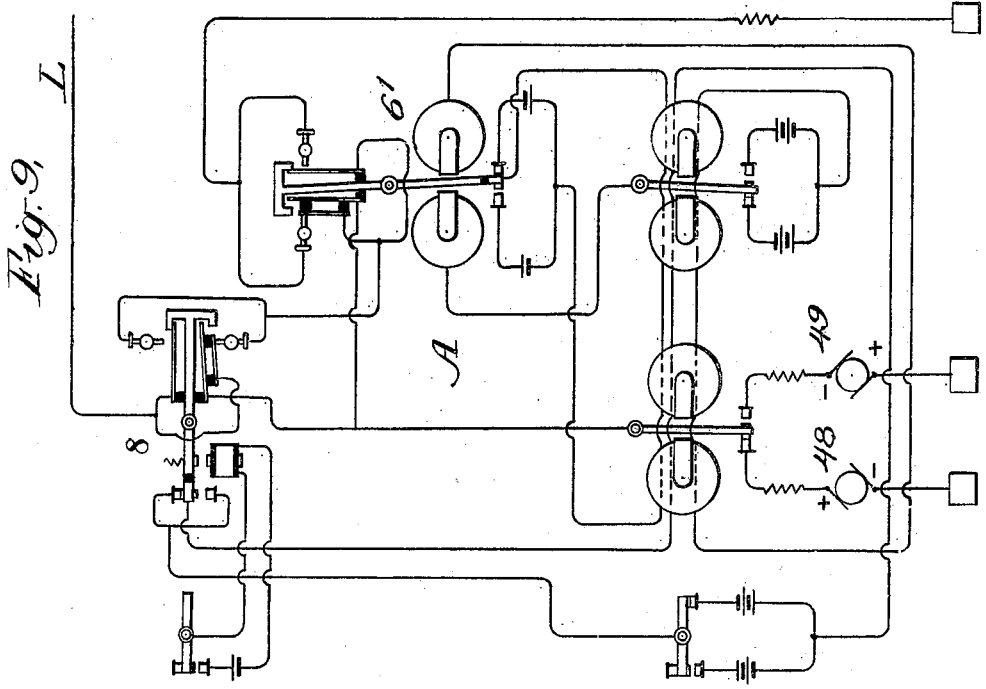
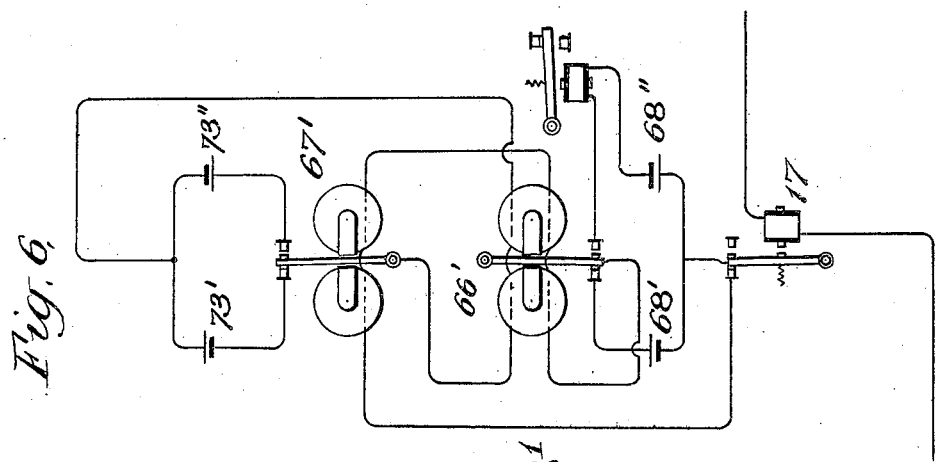
WITNESSES:
INVENTOR
Thomas B. Dixon
BY
ATTORNEYS

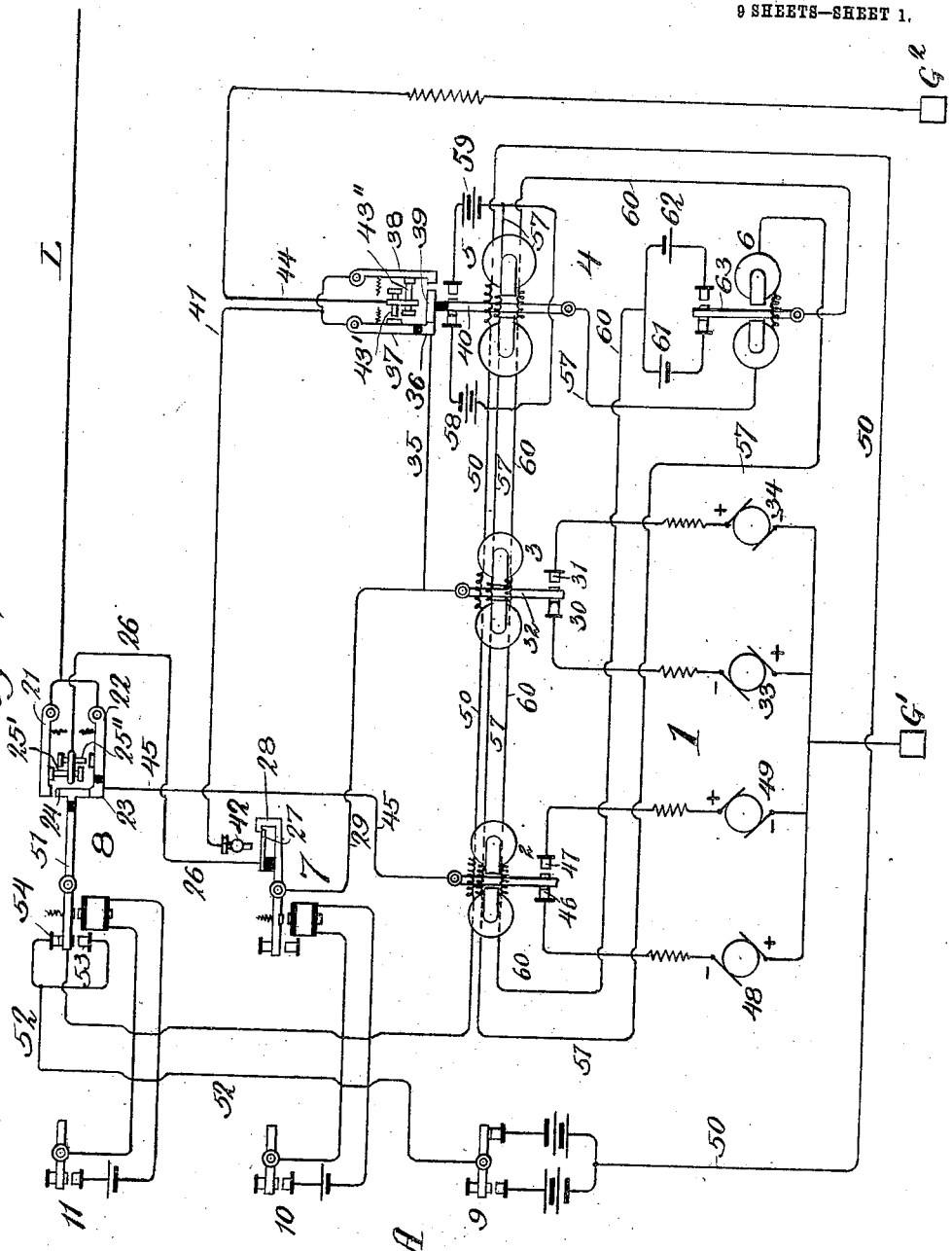

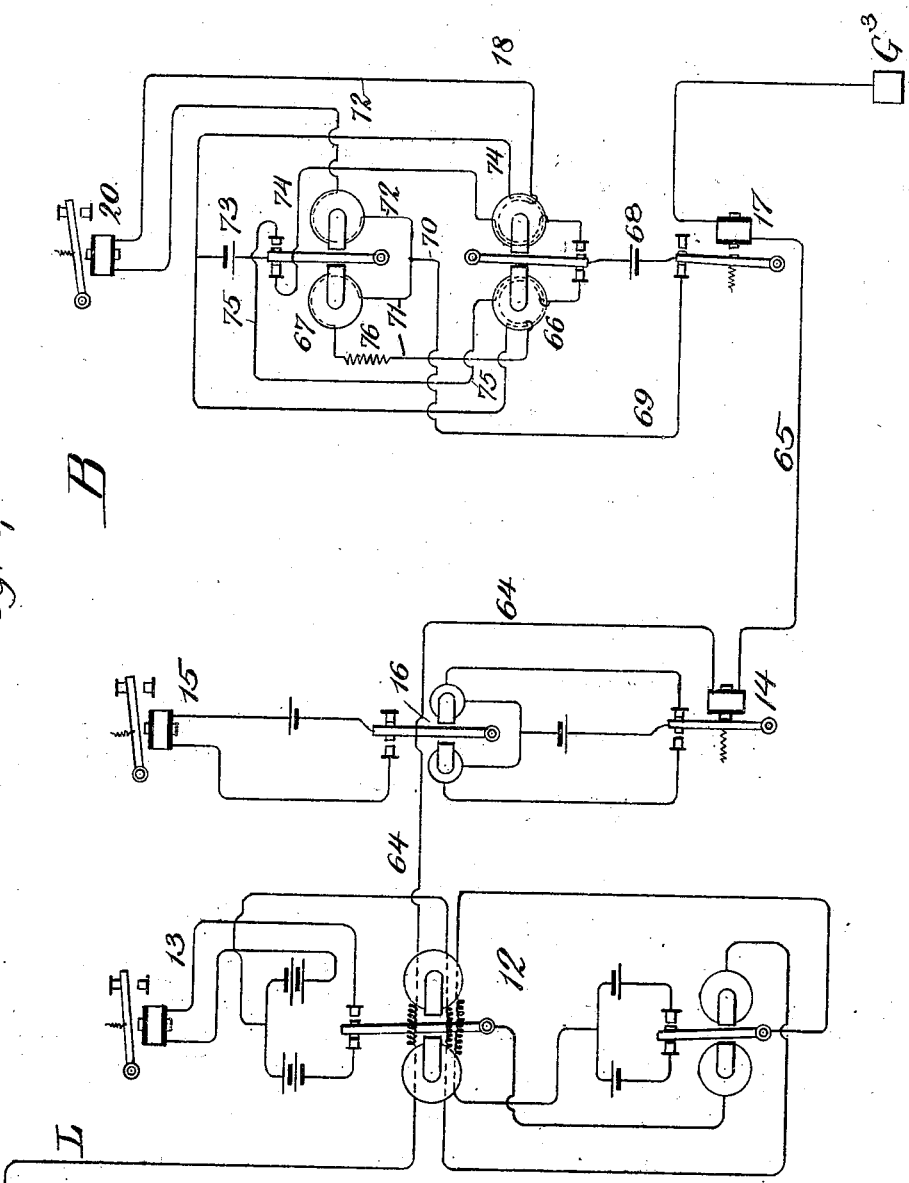

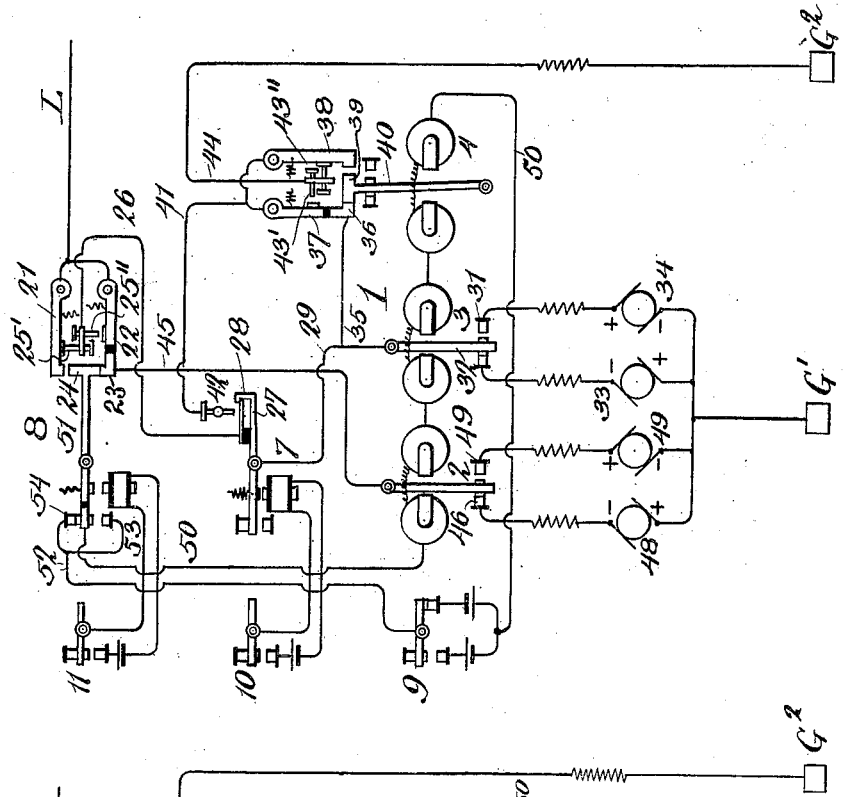

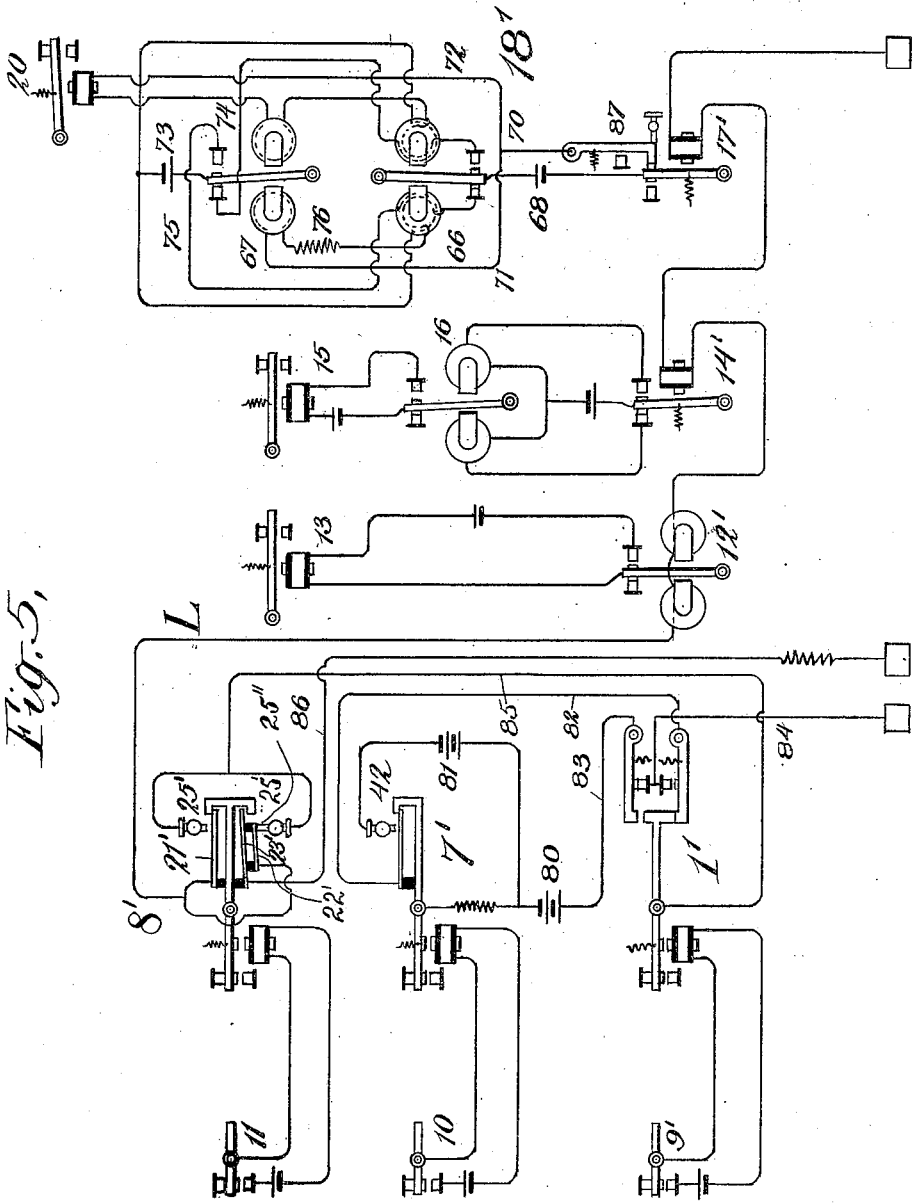

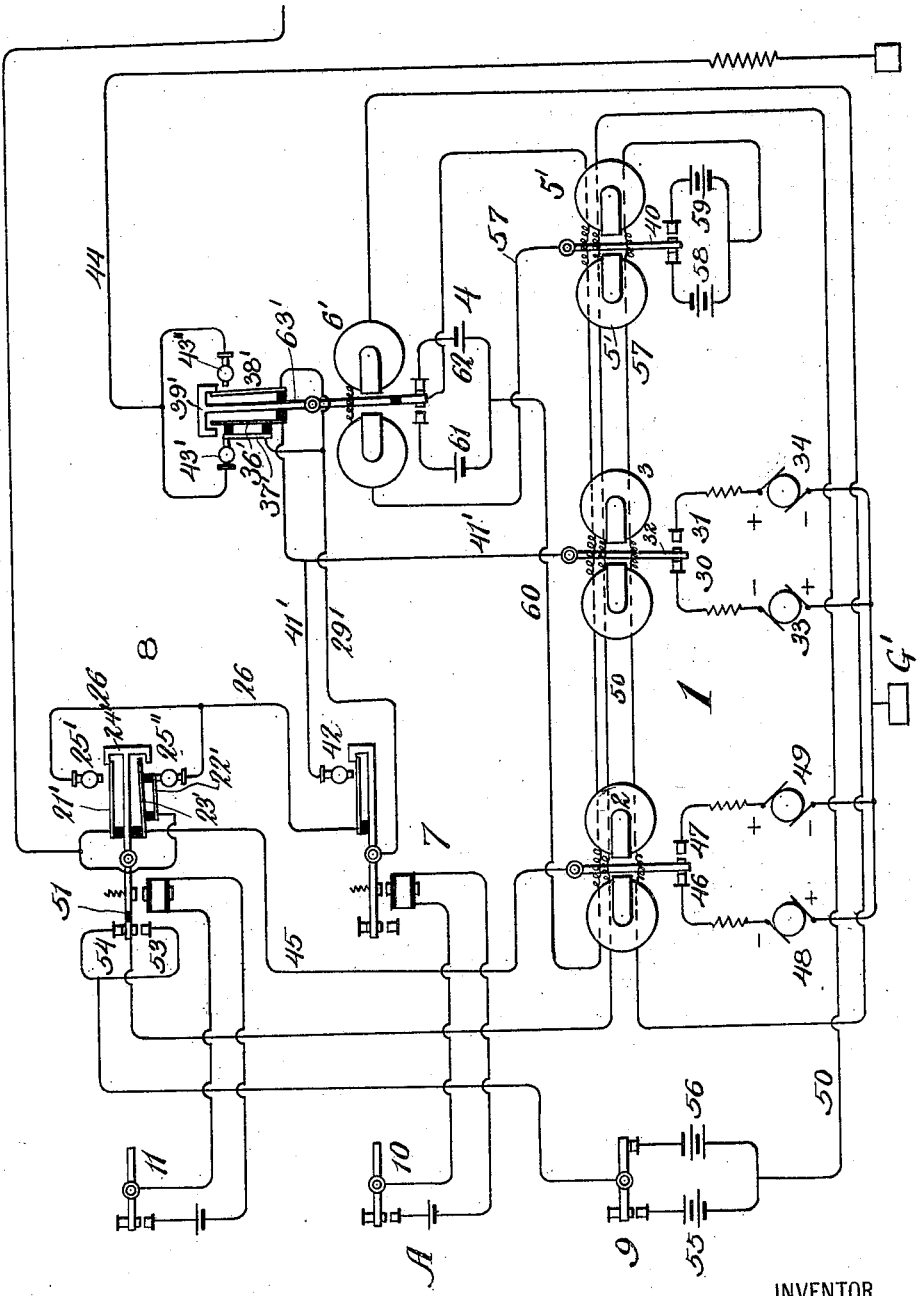

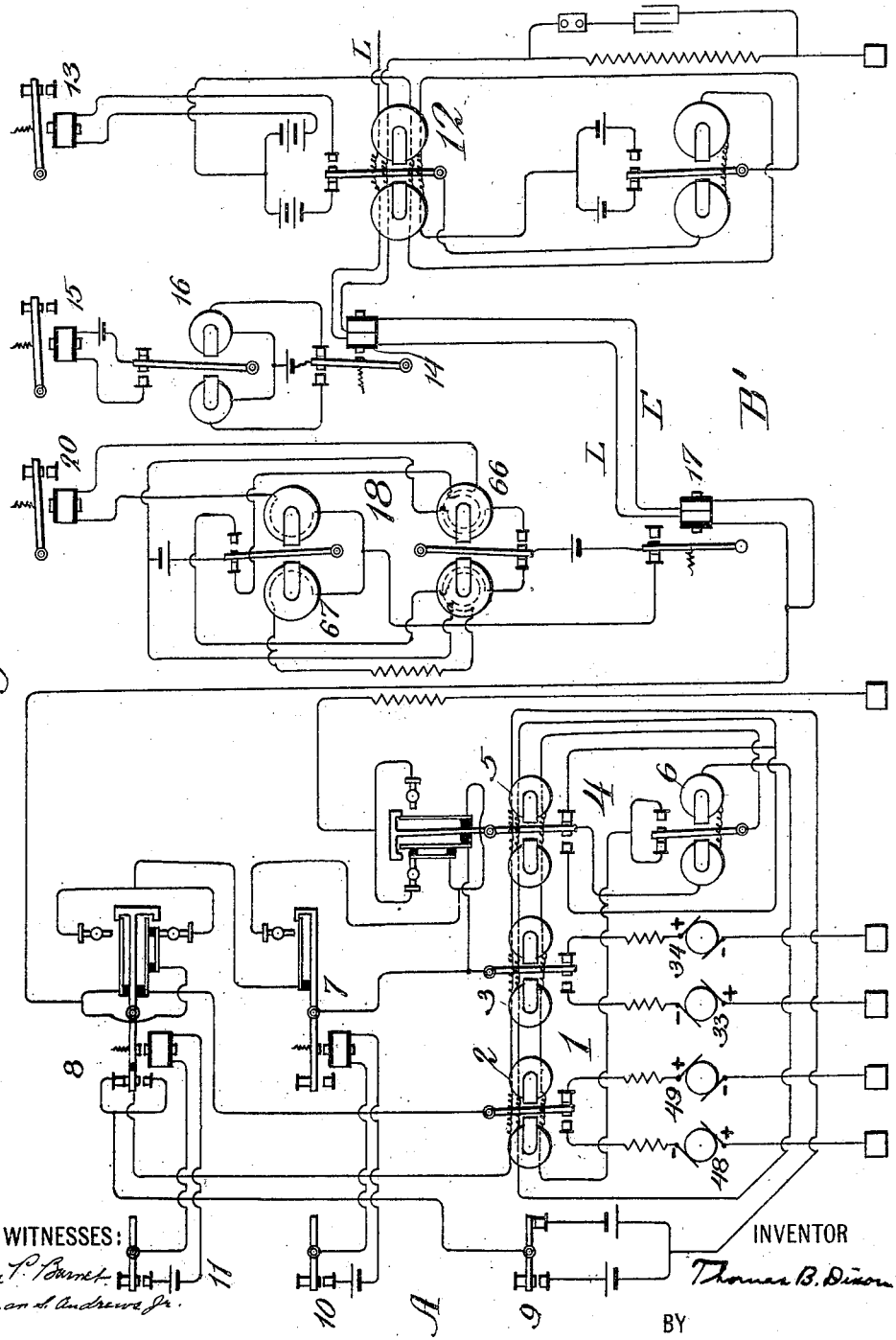

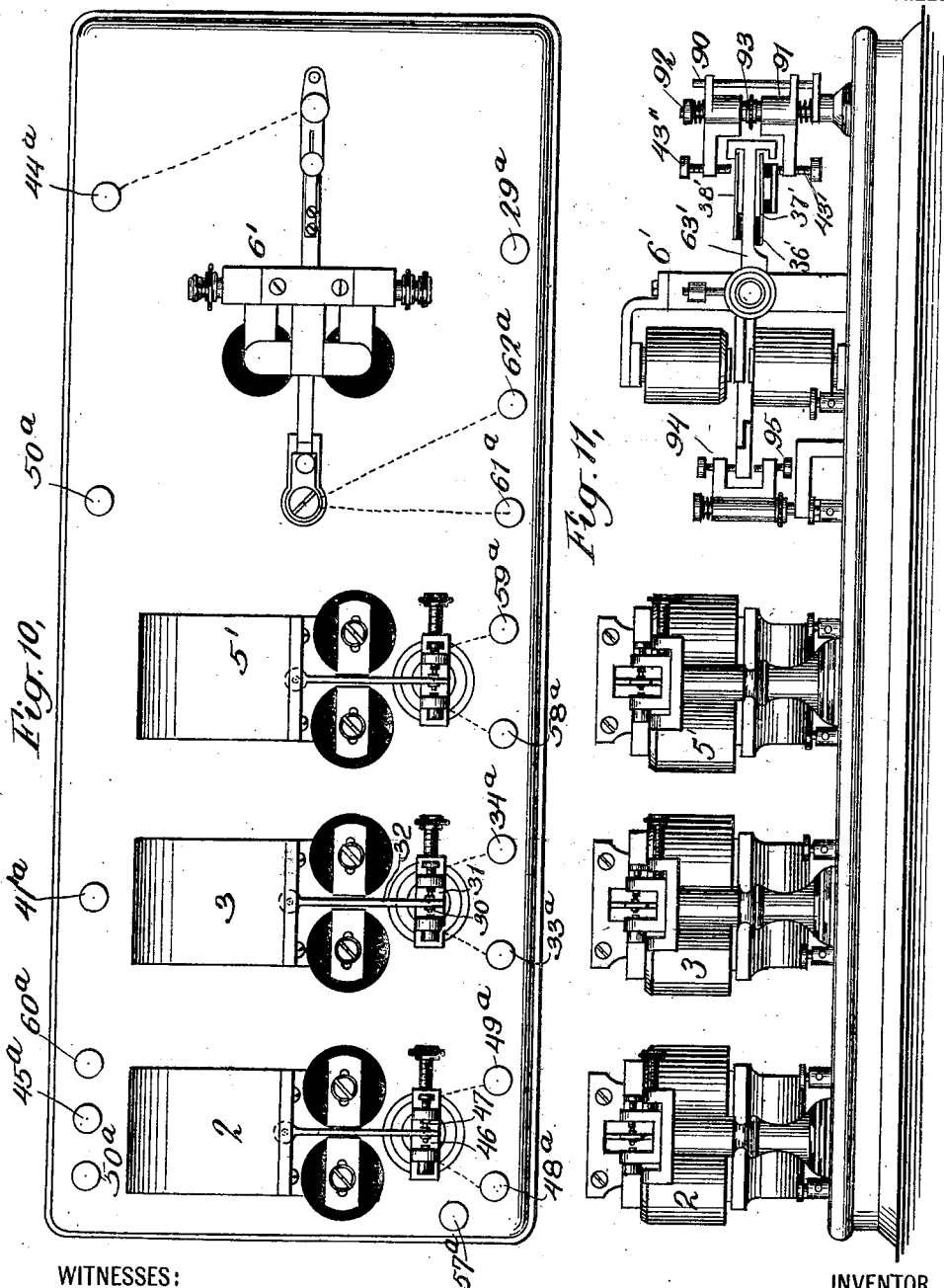

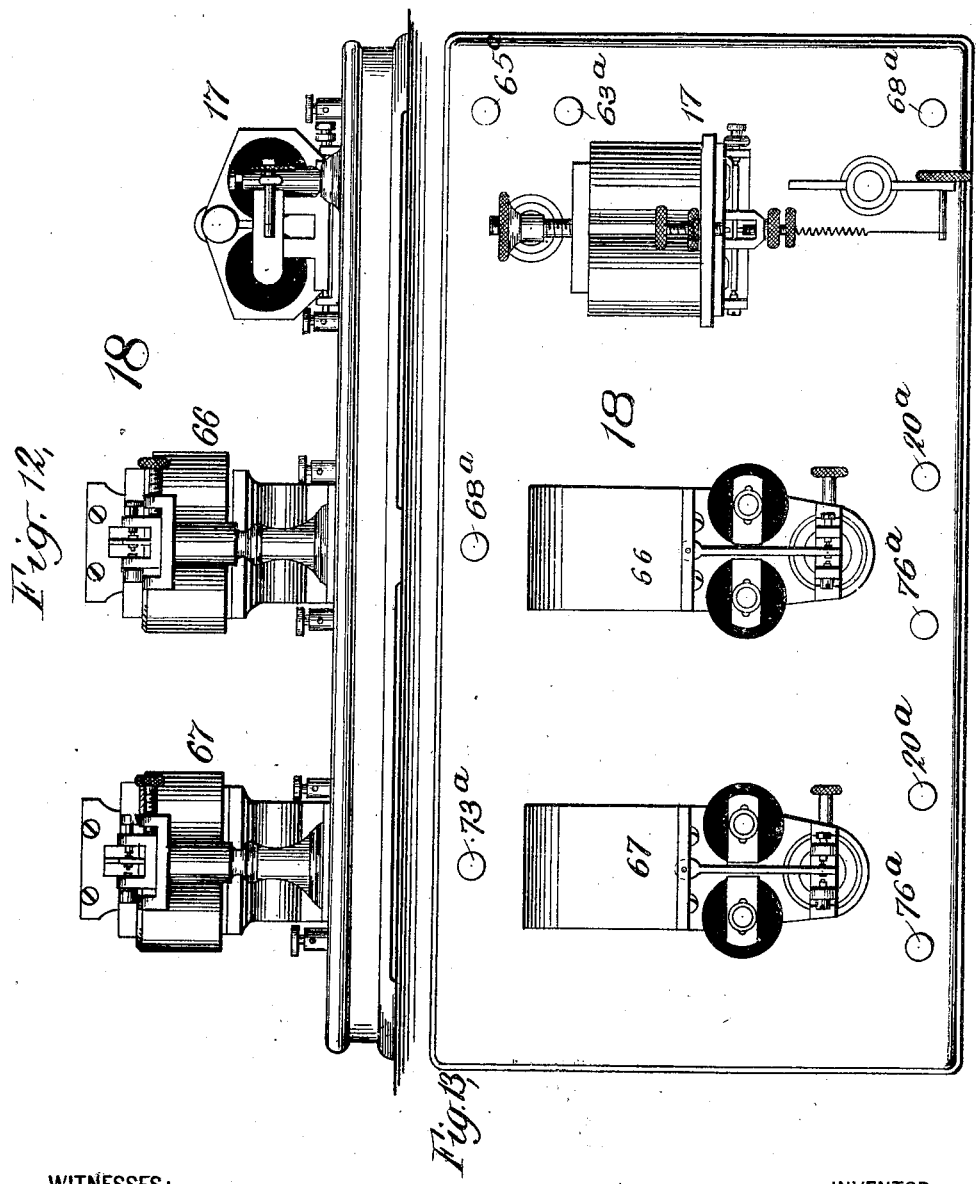

UNITED STATES PATENT OFFICE.

THOMAS BULLITT DIXON, OF NEW YORK, N. Y.

TELEGRAPHY.

No. 922,462.  Specification of Letters Patent.  Patented May 25, 1909.

Application filed July 5, 1904, Serial No. 215,313. Renewed July 9, 1907. Serial No. 382,933.

*To all whom it may concern:*

Be it known that I, THOMAS BULLITT DIXON, a citizen of the United States, residing at New York, in the county of New York and State of New York, have invented certain new and useful Improvements in Telegraphy; and I do hereby declare the following to be a full, clear, and exact description of the same, such as will enable others skilled in the art to which it appertains to make and use the same.

My invention relates, generally, to signaling systems and to instruments employed therein, and particularly to improvements in systems of multiplex telegraphy whereby a plurality of distinct and separate messages may be transmitted simultaneously over a single line wire.

The system herein described is intended for the transmission of six or more messages over a single line wire, three in one direction and three in the other, or for the transmission of a smaller number of messages more perfectly and over longer lines than is practicable with former multiplex systems, and is an improvement upon the sextuplex system illustrated and described in Letters Patent No. 549,709, of November 12, 1895, issued to me for improvements in multiplex telegraphy. In my said former system one of the three messages which are transmitted in each direction is transmitted by reversal of the line polarity, the other two messages being transmitted by throwing into and out of the line two batteries or sources of electrical energy of unequal strength. That system differs from all systems of multiplex telegraphy preceding it and employing reversals of current for transmitting messages, in that no battery or other source of current is required to be constantly to the line in order to operate the polar receiving instruments of the system, the pole changing transmitter being arranged to throw into the line, for a brief instant, at the instant of reversal of polarity or immediately thereafter, one of the batteries controlled by the current varying transmitters. There is thus produced in the line a pulsation of current which is of sufficient duration to operate the polar relay at the receiving station, but is of too brief duration to operate any of the line neutral relays at the receiving station to such an extent as to produce false signals or mutilation of signals by the action of those relays.

In the system herein described I employ the same pulsatory current arrangement for operating the polar receiving instruments of the system, and in addition I operate one of the neutral receiving instruments at each receiving station by similar pulsations of current of different strength from those which operate the polar receiving instruments. By this means I am able to materially reduce the maximum line potential, and thus to operate a sextuplex system with lower potential than is required by quadruplex systems such as are now generally used, or, while retaining the line potential of the former quadruplex systems, to secure a much greater working margin and so obtain far better signals. The reduction in potential, or increase in the working margin, materially decreases the difficulty experienced in operating multiplex lines, due to induction, static disturbances, leakage, and similar disturbing causes, the effects of which are so serious as frequently to render the neutral sides of the former quadruplex lines inoperative during unfavorable weather.

My invention consists in operating one of the neutral receiving instruments of the system at each receiving station by double or successive current impulses, which, when the system also comprises ordinary neutral or single current transmitters and receivers, may be of too brief duration to operate such ordinary neutral receivers. And my invention also consists in the novel neutral and pole changing transmitting instruments herein described, in the novel neutral double or pulsatory current receiving instruments or relays herein described, and in the novel combinations of circuits and instruments which are embodied in the system.

In the following description I describe, and in the drawings which accompany and form a part of this specification I illustrate, a sextuplex system of telegraphy, employing, for each direction or transmission, an ordinary neutral or single current transmitter and receiver, a pulsatory-current transmitter and receiver, and a neutral double current or pulsatory-current transmitter and receiver. By omitting the neutral current varying transmitters and receivers a new quadruplex system is formed which has many advantages over former quadruplex systems, one of which is that, since the neutral sides of the quadruplex are unaffected by the current reversals, and the currents operating the neutral sides are or may be pulsatory currents of very brief duration, such as are produced by condensers, it is capable of being used on submarine cable lines where it is necessary to transmit through condensers. This is to my knowledge the first quadruplex system capable of working through condensers over lines many hundred miles in length and therefore capable of use on long submarine cable lines. By omitting from the sextuplex herein described and illustrated, the polar transmitters and receivers, another new quadruplex system is formed, which likewise possesses advantages, for some uses, over former quadruplex systems.

The objects of my invention are, first, to provide a system of multiplex telegraphy in which three or more messages may be transmitted in the same direction over a single wire and which may be combined with well known methods of double transmission of messages in opposite directions so that an equal number of messages may be transmitted at the same time in the opposite direction over the same line wire and without mutilation of signals, and which shall require a smaller maximum line potential, or shall have a greater working margin, than the multiplex systems heretofore devised; second, to provide improved systems of duplex and quadruplex telegraphy; third, to provide a quadruplex system adapted for use on submarine cable lines; fourth, to provide improved pulsatory current neutral and pole changing transmitting instruments; fifth, to provide a neutral receiving instrument adapted to be operated by double or successive current impulses, and which shall be more sensitive than ordinary neutral relays to currents of brief duration; and sixth, to make the construction and arrangement of the signals and instruments of this system as simple as possible, to provide for the easy adjustment of the instruments by making it possible to group the contacts and instruments relating to each key near that key, and to render the system free from liability to derangement. These objects are attained in the system of telegraphy herein described and illustrated in the drawings which accompany and form a part of this specification, in which the same reference letters and numerals indicate the same or corresponding parts, and in which:—

Figure 1 is a diagram of the arrangement of the circuits and instruments at the transmitting station of a system arranged for transmitting three simultaneous messages over a single line wire in one direction, and Fig. 2 is a diagram illustrating the arrangement of the circuits and instruments at the receiving station corresponding to Fig. 1, Figs. 1 and 2 in fact forming one continuous diagram, although in order to permit sufficient separation of the various circuits and instruments to render the diagram clear, they are shown on separate sheets. The circuits and instruments of Fig. 1 are arranged for the operation of the system by dynamo currents. Fig. 3 is a further diagram of the transmitting station, illustrating the arrangement of circuits and instruments employed when the difference in rapidity of action of the neutral pulsatory current transmitter and the current reversing relays of the polar pulsatory current transmitter is relied upon entirely to prevent interference between the transmitters when operating simultaneously. Fig. 4 is a diagram similar to Fig. 1, except that the circuits are arranged for the use of batteries instead of dynamos. Fig. 5 is a diagram similar to the diagram of Figs. 1 and 2, illustrating, however, the circuits and instruments as arranged for operating the neutral pulsatory instruments by pulsatory current breaks or negative current impulses, instead of by actual or positive current impulses. Fig. 6 is a diagram illustrating a modified form of double current neutral receiving instrument. Fig. 7 is a diagram similar to Fig. 1, but illustrating a preferred arrangement of the continuity preserving contact points of the pulsatory current transmitters, a preferred arrangement of the relays and contact points of the polar pulsatory current transmitter, and a modified arrangement of the circuits affected by the neutral single current transmitter. Fig. 8 is a complete diagram of the transmitting and receiving instruments and circuits at one end of a sextuplex line. Fig. 9 is a diagram showing a pulsatory current polar transmitter and a pulsatory current neutral transmitter, both controlling a line current from the same generating element and arranged to produce different current strengths in the line by means of the difference in length of the current impulses produced by the operation of their contact points. Fig. 10 is a plan view and Fig. 11 is an elevation, of the polar pulsatory-current transmitter, the circuits and arrangement of the relays being that shown diagrammatically in Fig. 7. Fig. 12 is an elevation, and Fig. 13 a plan view, of the double current neutral receiving instruments shown diagrammatically in Figs. 2 and 8.

Referring now to the drawings, and first of all to Figs. 1 and 2, A, Fig. 1, is the transmitting station, and B, Fig. 2, is the receiving station. 1 is the pulsatory-current pole changing transmitter, composed of polar relays 2, 3, and a special polar instrument or relay 4, which is fully described and illustrated in Letters Patent No. 560,313, of May 19, 1896, issued to me, and which itself consists of two subordinate polar relays, viz., a main relay 5, and a secondary or reversing relay 6, united by circuits as described in said patent, and as briefly described herein.

This relay 4 acts substantially as an ordinary polar relay, except that it is far more sensitive to currents of brief duration. To distinguish it from ordinary polar relays it may therefore be termed a pulsatory-current polar relay. 7 is an ordinary current varying or "single" transmitter, such as is commonly used in present quadruplex systems, and which, to distinguish it from the pulsatory-current polar transmitter 1, and from the third transmitter, 8, may be termed a neutral single current transmitter. Its function is to vary the current strength in the line, as by throwing a generator out of the line for definite intervals of time, and so to operate an ordinary neutral relay or receiving instrument at the receiving station. 8, the third transmitter, is a neutral instrument, that is, it does not change the line polarity when operated, its function being to increase, momentarily, when operated, both at the beginning and at the end of each of its signals, the strength of the line current, and thereby to operate a neutral double-current receiving instrument or relay at the receiving station which is arranged to be unaffected by the weaker current controlled by transmitter 7. This momentary increase in strength of the line current may be obtained most conveniently by employing two sets of generators of different strengths or potentials, the current of one set being controlled by transmitter 7, and of the other set by transmitter 8, and the direction of the current derived from both sets of generators being controlled by transmitter 1.

Each of the three transmitters 1, 7 and 8, is preferably operated in the usual manner by hand-keys, numbered 9, 10, and 11 respectively, of which 9, the key which controls transmitter 1, is a current reversing key. The reversal of the current by the key is most easily accomplished by using two separate local batteries oppositely placed, so that the key need be merely a double point key.

L is the line conductor.

In Fig. 2, 12 is a polar relay, and like relay 4 is of the special type described and illustrated in my above-mentioned Patent No. 560,313, being especially adapted, by reason of its construction, to be operated by currents of extremely brief duration. 13 is a sounder or receiving instrument operated by polar relay 12, and responds to transmitter 1. 14 is an ordinary neutral relay which controls a sounder 15, responding to transmitter 7, through the medium of a dead beat relay 16, such as is described in Letters Patent No. 543,984, of August 6, 1895, issued to me for a system of multiplex telegraphy, and which is further described and illustrated in both of my former patents above mentioned. Dead beat relay 16 acts merely to prevent the sounder 15 from being influenced by slight kicks of the armature of line relay 14.

17 is a line neutral relay, which, with two other relays, 66 and 67, which are dead beat relays, form a neutral receiving instrument 18 which responds to the operation of transmitter 8 only, and controls sounder 20. Instrument 18 is of the general nature of a neutral relay, but differs from ordinary relays in that it is operated by double or successive impulses of current, one impulse changing it from its normal condition, and the next succeeding impulse restoring it to its normal condition. It is also very sensitive to current impulses of very brief duration, but its normal operation is not interfered with in any way if the impulses which operate it are prolonged instead of brief. 17 is the actuating element of the relay 18.

Referring now to Fig. 1, and taking up the detailed description of the circuits and instruments there shown, it will be seen that the line conductor L is connected to two continuity-preserving contact points, of which one, 21, is adapted to make contact with an armature contact piece 24 and with a contact stop 25', while the other, 22, is adapted to make contact only with the contact stop 25'', (electrically connected with stop 25',) although it is mechanically connected with and moves with, but is insulated from, a third contact point, 23, which is adapted to make contact with the armature contact piece 24. The continuity preserving contact points are so adjusted that contact points 21 and 23 are both in contact with contact piece 24 for a considerable portion of the travel of the armature of the transmitter 8. During each movement of this armature, therefore, there is a moment, when, contact points 21 and 23 being both in contact with 24, current may pass from the one to the other.

The arrangement of contact points of transmitter 8 is similar to that of the contact points of a pole changing transmitter, differing, however, in the insulation of what are in this instrument separate contact points 22 and 23, but which in the ordinary pole changing transmitter are but one contact point similar to contact point 21 of this instrument; and differing also in the adjustment of the contact points, which is such as to cause contact points 21 and 23 to be in contact with the armature contact piece 24 for a greater portion of its travel than is customary in pole changing transmitters.

The contact stops 25' and 25'' of transmitter 8 are connected by a conductor 26 with the contact tongue 27 of transmitter 7. Normally this contact tongue is in contact with the armature lever 28 of transmitter 7. The armature lever 28 is connected by a conductor 29 with the armature 32 of polar relay 3. This armature is adapted to make contact with two contact points 30 and 31. 30 is connected with the negative pole of dynamo 33, and 31 with the positive pole of a similar but oppositely connected dynamo 34. The positive pole of dynamo 33 and the negative pole of dynamo 34 are connected to ground at G'. Dynamos 33 and 34 produce currents of the same potential, but of opposite direction, since they are connected oppositely to the contact points of relay 3 and to ground. The armature of transmitter 7 is also connected by conductor 29 and a branch conductor 35 to a continuity-preserving contact point 36 of relay 5. The contact points of relay 5, which are the external circuit contact points of pulsatory-current instrument 4, are arranged and adjusted similarly to the contact points of transmitter 8. The armature contact piece 39 is insulated from the armature lever 40, and the contact points 37 and 38 are connected by a conductor 41 to the contact stop 42 of transmitter 7. The contact stops 43' and 43'' are connected by a conductor 44 to ground at $G^2$. It will be seen, therefore, that during the time when the contact tongue 27 of transmitter 7 is in contact with its contact stop 42, so that the generators at the transmitting station are out of the line circuit, the line conductor L is connected to ground at $G^2$ through conductor 41, the contact points of relay 5, and conductor 44, (it being essential that this shall be the case in order that the system may be capable of being duplexed to provide for the transmission of an equal number of messages in the opposite direction). If, while the transmitter 7 is in this condition, the armature of relay 5 is moved from left to right or vice versa, one of the generators 33 and 34 is placed in the line during the brief instant when the armature contact piece 39 is in contact both with contact point 36 and contact point 38, and when neither contact point 37 nor contact point 38 is in contact with its stop.

The contact point 23 of transmitter 8 is connected by a conductor 45 with the armature of polar relay 2, the contact points 46 and 47 of which are connected respectively to the negative pole of generator 48 and to the positive pole of generator 49. The positive pole of generator 48 and the negative pole of generator 49 are connected to ground at G'. Dynamos 48 and 49 are exactly alike, and produce currents of the same potential but of opposite direction, since they are connected oppositely to the line. They produce currents of greater potential than dynamos 33 and 34. The operation of transmitter 8 has the effect of placing one of the generators 48 and 49 in the line circuit, during the brief instant when the armature contact piece 24 of transmitter 8 is in contact with the contact points 21 and 23, during which interval neither of contact points 21 and 22 is in contact with the stops 25' and 25'' of the transmitter. If the transmitter 8 operates during the time when the transmitter 7 has thrown both generators 33 and 34 out of the line circuit, one of the generators 48 and 49 is nevertheless thrown into the line circuit, which is completed to one of these generators through the conductor, 45, which does not pass through transmitter 7.

Relays 2, 3, and 4 are all controlled by a circuit passing through conductor 50 and controlled by key 9. Conductor 50 is connected to the armature 51 of transmitter 8, and a conductor 52 is connected to contact stops 53 and 54 adapted to make contact with this armature, and to key 9, completing the circuit. During the time while the armature 51 of transmitter 8 is moving the circuit passing through conductors 50 and 52 is broken; but it remains broken for but a brief instant, much shorter than any "dot" of the telegraphic code.

Relay 4, as has already been stated, is the polar relay described and covered by my Patent No. 560,313. It has, therefore, besides the circuit of conductor 50, which is the primary circuit of the relay, two other circuits, termed secondary and tertiary circuits respectively, of which the secondary circuit normally influences the armature 40 in the same manner as the primary circuit, and the tertiary circuit normally opposes the secondary and the primary circuits. The secondary circuit passes through conductor 57, and coils of relays 5 and 6, and also through coils of relays 2 and 3. The conductor 57 is connected at one end to two similar but oppositely placed batteries 58 and 59, and at the other end is connected to the armature 40 of relay 5. The other poles of batteries 58 and 59 are connected to contact points which make contact with the armature 40. When the armature 40 moves from left to right it throws battery 58 out of the secondary circuit and throws battery 59 into this circuit; and when the armature moves from right to left it throws battery 59 out of the secondary circuit and throws battery 58 into this circuit. The effect of the movement of the armature, therefore, is to reverse the current of the secondary circuit. During the time while the armature is moving there is no current in the secondary circuit. The effect of the reversal of current in the secondary circuit upon relay 6, which controls the tertiary circuit, is to operate this relay. The tertiary circuit passes through conductor 60, which passes through coils of relays 5, 3, and 2. At one end this conductor is connected to batteries 61 and 62, which are similar but oppositely placed, and at the other end the conductor is connected to the armature 63 of relay 6. The other poles of batteries 61 and 62 are connected to opposite contact points which make contact with armature 63. Therefore the effect of the operation of relay 6 is to reverse the current in the tertiary circuit.

As has been stated, the secondary and tertiary circuits in relays 5, 3, and 2, oppose each other, though the tertiary circuit exerts the lesser influence upon the armatures. The difference in strength of the currents of the secondary and tertiary circuits, and the strength of the current of the primary circuit, are such that if the primary circuit is reversed, so that its influence is added to that of the tertiary circuit, it will overbalance the secondary circuit and move the armature 40 and the armatures of relays 3 and 2. The slightest movement of the armature 40 breaks the secondary circuit, and thereafter the full strength of the primary and tertiary circuits acts to cause the magnets to pull the armature 40 and the armatures of relays 3 and 2 into their opposite positions. This pull can be made very powerful, and hence the operation of the relays, and particularly of relays 3 and 2, which may have very light armatures, will be very rapid. If, after the secondary circuit is broken, the primary circuit is broken, as it may be by the operation of transmitter 8, the tertiary circuit will nevertheless carry the armatures over. The instant the movement of armature 40 is completed the secondary circuit is again established, but in the opposite direction, through the coils of relays 5, 6, 3, and 2, the relay 6 is operated, and the tertiary circuit is reversed, the armatures of relays 5, 3, and 2 being held stationary after the reversal of the tertiary circuit, however, by the overbalancing influence of the secondary circuit, so that nothing but an actual reversal of the primary circuit can operate the relays.

During the time while the armatures of relays 3 and 2 are moving none of the generators are to the line. The movement of these armatures must not take place, therefore, at the instant when the contact piece 24 of transmitter 8 is in contact with both contact points 21 and 23, else the operation of the transmitter 8 at that instant would not place either of generators 48 and 49 in the line. It is for this reason that the controlling circuit of transmitter 1, which is the primary circuit of relays 4, 3, and 2, passes through contact points of transmitter 8 and is interrupted during the time that the armature of transmitter 8 is moving. Relays 2 and 3 have comparatively light armatures, while the armature of transmitter 8 is comparatively heavy, so that the operation of transmitter 8, as compared with relays 3 and 2, is somewhat sluggish. This sluggishness of transmitter 8 is merely comparative, and is most easily obtained by using a somewhat heavy armature lever. The result of this sluggishness of movement is, that if the armatures of relays 3 and 2 begin to move simultaneously with or before the armature of transmitter 8 begins to move, the movement of these armatures will be completed and the reversal of polarity, which results from this movement, effected, before the armature of transmitter 8 has moved so far as to complete the circuit through its contact piece 24. The breaking of the primary circuits of relays 4, 3, and 2, it must be noted, does not prevent the operation of these relays after their armatures have once begun to move, because when the secondary circuit is broken, the tertiary circuit alone is able to carry the armatures over, without the aid of the primary circuit.

If the key 9 is not operated until, through the operation of the key 11, the armature of transmitter 8 has begun to move, transmitter 1 will not operate, owing to the breaking of its primary circuit by the armature of transmitter 8, until this armature has ceased to move, when it will operate and with sufficient rapidity so that the operation will be completed within the period of time occupied by the shortest "dot" which can be made by a telegraph operator.

The difference in rapidity of operation of the polar relays 3 and 2, and relay 4 and transmitter 8, may be relied upon entirely to prevent interference between the signals of the various transmitters. In such case the secondary and tertiary circuits of relays 4, 3, and 2 are dispensed with, and relay 4 becomes an ordinary polar relay. Fig. 3 illustrates this arrangement of circuits and instruments. The armature of transmitter 8 should then be made considerably heavier than those of relays 3 and 2, as should the armature of relay 4. The magnets and circuits of the relays and transmitter 8 may also be so arranged as to make relay 4 and transmitter 8 more sluggish in action than relays 3 and 2, in many well known ways, it being well known that certain forms of relays, as for instance those in which very short magnets are used, operate much more rapidly than other forms of relays, as for instance those in which comparatively long magnets are used.

Instead of dynamos, batteries may be used to supply the current to the line. The arrangement of circuits and contact points when batteries are used, is shown in Fig. 4. Relays 3 and 2 are provided with ordinary pole changing contact points, when batteries are used, and reverse the line polarity by changing the poles of the batteries.

Referring now to Fig. 2, which is the receiving station, it will be seen that the line conductor L is connected to the primary circuit of polar relay 12 and thence passes through conductor 64, line neutral relay 14, conductor 65, and neutral relay 17 of receiving instrument 18, to ground at $G^3$. It has already been stated that polar relay 12 is the relay described in my above-mentioned patent No. 560,313, and that it is similar to relay 4, described above. Its manner of operation will therefore be apparent, and need not be here described. It has also been stated that relay 14 is an ordinary line neutral relay, and controls its sounder through a dead beat relay, as described in my Patent No. 543,984. It is not necessary, therefore, for me to describe here the action of the dead beat relay. Receiving instrument 18, which controls sounder 20, is, however, a new instrument, of a new type, and requires detailed description.

As above stated, instrument 18 is of the general nature of a relay, composed of three subordinate relays, viz., 17, which is an ordinary line neutral relay and is the actuating element of the instrument, and 66 and 67. Relays 66 and 67 are dead beat relays. The circuits of instrument 18 are as follows: The negative pole of a local battery 68 is connected to the armature of line relay 17. From the rear contact stop of this relay a conductor 69 leads to 70, where the circuit divides, one branch 71 passing through coils of relays 67 and 66 to a contact stop of relay 66. The armature is connected to the positive pole of battery 68. The other branch circuit 72 from the dividing point 70 passes through coils of relays 67 and 66 which oppose the coils through which branch circuit 71 passes, and also passes through the sounder 20. The branch circuit 72 terminates at a contact stop of relay 66 opposite to that to which circuit 71 is connected. It will be noted that only one of these two branch circuits 71 and 72 can be energized at any instant, and during the time while the armature of relay 66 is moving, or while the armature of relay 17 is away from its rear stop, both circuits are broken.

The armature of relay 67 is connected to the positive pole of a battery 73. From one contact stop of this relay a circuit 74 passes through coils of relay 66 which oppose the coils of relay 66 through which circuit 71 passes, and thence to the negative pole of battery 73. From the opposite stop of relay 67 a circuit 75 passes through coils of relay 66 opposing those through which circuit 74 passes, and thence to battery. Circuits 74 and 75 can not both be energized at the same instant. Batteries 68 and 73 may be of equal strength.

When the instruments are in the position shown in the drawings, circuits 71 and 74 are energized, and 72 and 75 are broken. The magnet coils of relay 66 through which circuit 74 passes oppose the magnet coils of that relay through which circuit 71 passes. But since the armature is in proximity to the left hand magnet, the influence of the circuit 71 is the stronger, and suffices to keep the armature stationary.

Receiving instrument 18 operates by the kicks of line relay 17 produced by the operation of transmitter 8. The retractile spring of relay 17 is so adjusted that the relay does not respond, even by a kick, to the operation of transmitters 1 and 7, which can merely throw generators 33 and 34 into and out of the line, but does respond by a kick each time one of the generators 48 and 49 is thrown into the line by transmitter 8. A kick of the armature of relay 17, when the armatures of relays 66 and 67 are in the position shown in the drawings, breaks the circuit of battery 68, thus releasing the armature of relay 66 and causing the coils of that relay energized by the branch circuit 74 of battery 73 to draw the armature to the right. As soon as the armature of relay 17 returns to its rear contact stop the circuit of battery 68, through branch 72, is completed through the coils of relay 67, sounder 20 and relay 66, thus energizing the magnet of sounder 20 and moving the armature of relay 67 to the right, thus breaking circuit 74 and completing circuit 75. The circuits and instruments remain in this condition, with the magnet of sounder 20 energized, until there is another kick of relay 17, when, as soon as circuit 72 is broken, the coils of relay 66 energized by circuit 75 draw the armature of relay 66 to the left and as soon as the armature of relay 17 is again in contact with its rear contact stop, circuit 71 is again established, thus moving the armature of relay 67 to the left and breaking the circuit through the magnet of sounder 20.

Relay 18 is not restricted to being operated by what are, strictly speaking, pulsatory currents. So far as the receiving instrument 18 is concerned, it may be operated by currents of any length, provided they are not of too brief duration to cause even a kick of the line relay 17. The instrument cannot be rendered inoperative or caused to operate wrongly through one of the current pulses which operates it being continued too long. But where the receiving instrument 18 is operated upon the same line with an ordinary neutral receiving instrument such as relay 14, the current pulses which operate the instrument 18 must not be so long as to cause the operation of the sounder 15 controlled by relay 14. It is of course true that a current which will cause a kick of relay 17 will also cause a kick of relay 14. But since the sounder 15 is controlled by relay 14 through the medium of the dead beat relay 16, the mere kick of relay 14 will not cause the operation of the sounder. Moreover it has been found that instrument 18 will operate with so slight a kick of its line relay 17, that even if the dead beat relay 16 be not interposed between line relay 14 and sounder 15, the sounder will not be operated to such an extent as to make an audible signal. Where transmitters 1 and 8, with their respective receivers 12 and 18, are used in a diplex or quadruplex system, the neutral single current transmitter 7 and receiver 14 being omitted, the currents which operate receiver 18 may be of any convenient length. Receiver 18 is therefore as truly a double current instrument as is an ordinary polar relay. But it differs from an ordinary polar relay in that it may be operated by two successive currents or current impulses of the same direction, whereas a polar relay requires two successive current impulses of opposite direction.

Relay 17 may be termed the actuating or primary relay of instrument 18, relay 66 the secondary relay, and relay 67 the tertiary or reversing relay. The line circuit is the controlling or primary circuit, the two branch circuits of battery 68 may be termed secondary circuits, and the two branch circuits of battery 73 may be termed tertiary circuits of the instrument.

To balance the resistance of the magnet of sounder 20, in circuit 72, circuit 71 has a resistance coil 76.

Instrument 18 is not necessarily operated by momentary increase in current strength. Instead, it may be operated by momentary decrease in the current strength, the armature of the actuating relay 17 kicking away from its magnet instead of toward it. Fig. 5 shows this arrangement diagrammatically, three transmitters and their corresponding receivers being shown. $1^1$ is the polar transmitter $7^1$ the neutral single current transmitter, and $8^1$ the neutral pulsatory current transmitter. The diagram shows batteries for supplying current to the line, though of course dynamos may be used. There are two such batteries. One, 80, is normally to the line, and the other, 81, is placed to the line by transmitter $7^1$ when its operating key is depressed. Battery 81 is then in series with battery 80.

The poles of battery 80, and also of battery 81 when in circuit, are connected by conductors 82 and 83 to the current reversing contact points of transmitter $1^1$. From the contact points of transmitter $1^1$, a conductor 84 leads to ground, and another conductor 85 leads to the contact stops 25' and 25" of transmitter $8^1$. The contact points 21' and 22' of transmitter $8^1$ are connected to the line conductor L, and the contact point 23' is connected to ground by a conductor 86. The circuit of battery 80 is complete, normally, through contact stop 25" and contact point 22'; or, when the magnet of transmitter $8^1$ is energized the circuit of battery 80 is complete through contact stop 25' and contact point 21'. But when the armature of transmitter $8^1$ is moving, the circuit of battery 80 is broken, the line conductor L being connected to ground, however, through contact points 21', 23', the armature, and conductor 86. The operation of transmitter $8^1$ therefore produces what may be termed a "pulsatory break" in the circuit.

Since there is a battery normally to the line, and since this battery is never out of the line for a longer period than while the armature of transmitter $8^1$ is moving, transmitter $1^1$ is not necessarily a pulsatory transmitter, but may be a simple current reversing transmitter, as shown. When operated, it reverses the poles of batteries 80 and 81 with respect to the line, and so reverses the direction of the current.

If transmitter $1^1$ is not a pulsatory current instrument, the receiving instrument, $12^1$, which responds to it, may be an ordinary polar relay, as shown. The receiving instrument $14^1$ which responds to transmitter $7^1$ is an ordinary neutral relay, as in Fig. 2, but is adjusted so that the current of battery 80 alone does not overcome the pull of its retractile spring, the relay being operated only by the current of batteries 80 and 81 together. The circuits of receiving instrument $18^1$, responding to transmitter $8^1$, are the same as in Fig. 2, except as to the arrangement of the contact points of the actuating or primary relay, 17'. The armature contact point engages a continuity-preserving contact point 87 on the front of the armature. The spring of the armature of relay 17' is adjusted that so long as battery 80 is to the line the armature is attracted, but as soon as battery 80 is cut out the armature is drawn back. When the contact points are separated, the secondary circuit of the instrument is broken, thus causing the operation of the sounder.

Relay $17^1$ has continuity preserving contact points, in order that it may not be operated by the drop in the line current due to the reversal of the current by transmitter $1^1$. The contact point 87 permits a slight movement of the armature, such as will be caused by the reversal of the line current, to take place without breaking the secondary circuit of the instrument $17^1$, but the contact is nevertheless broken when the battery 80 is thrown out of the line.

A pulsatory, or momentary break, in the line current, such as is produced by transmitter $8^1$, has, it will be seen, the same effect on receiver $18^1$ that a pulsatory or momentary current has upon receiver 18. It is the equivalent of an actual current. Such a pulsatory break is to be considered, broadly speaking, therefore, as a pulsatory current of negative character, and I intend that it shall be included by the terms "current impulse" and "pulsation of current" employed in the claims which follow; and I intend the method of transmission by momentary or pulsatory breaks in the current to be included within the terms "neutral double current" and "neutral pulsatory current" method employed in the claims.

Instead of employing two opposing secondary and two opposing tertiary circuits in instrument 18, but one secondary and one tertiary circuit may be employed, and the contact points of relays 66 and 67 may be caused to reverse the current in the secondary and tertiary circuits respectively. This is illustrated in Fig. 6, in which relay 66', corresponding to relay 66 of Fig. 2, has but one set of secondary coils and one set of tertiary coils, and relay 67', corresponding to relay 67, has but one set of secondary coils. The particular current reversing device employed consists of sets of similar but opposing batteries, 68' and 68'', and 73' and 73'', either of which may be placed to the line, according to which ever polarity is required.

Dividing the secondary and tertiary circuits and employing contact points to complete the one branch or the other as in the form of the instrument 18 shown in Fig. 2, is merely one way of obtaining a reversal of the action of the circuits; and the use of two secondary cicuits and of two tertiary circuits, only one of which can be energized at any instant, is to be considered merely as a convenient method of obtaining a reversal of action of what are in effect a single secondary and a single tertiary circuit.

The operation of the circuits and instruments shown in Figs. 1 and 2 may now be described. The instruments being in the position shown in the drawings, which is their normal position, if transmitter 7, which is the ordinary neutral transmitter, be operated by depressing key 10, it will throw the generators 33 and 34, controlled by relay 3, out of the line circuit, the line circuit being then completed to ground at $G^2$ through conductors 41 and 44 and the contact points of relay 4. This releases the armature of line neutral relay 14 at station B, Fig. 2, causing the operation of sounder 15 through dead beat relay 16. When key 10 is raised one of the generators 33 and 34 is thrown into the line and the armature of relay 14 is again attracted, thus restoring relay 16 and sounder 15 to their former condition.

When key 11, which operates the pulsatory current neutral transmitter 8 and neutral double current relay 18, is depressed, the armature 51 of the transmitter 8 is moved and for a brief instant the contact piece 24 is in contact with contact points 21 and 23, during which time neither contact point 21 nor contact point 22 is in contact with its stop 25' or 25''. During the instant while the armature contact piece 24 is in contact with points 21 and 23 the line circuit is complete from the line conductor L, through conductor 45, the armature of polar relay 2, and one of the generators 48 and 49, to ground at $G^1$. During this instant, therefore, a pulse of current of the potential produced by generators 48 and 49 passes through the line, and this current is of such strength that it causes the armature of the line relay 17 of receiving instrument 18 at station B, to kick, thus causing the armature of relay 66 to move to the right, and, as soon as the kick is ended, causing the armature of relay 67 to move in a similar manner and operating the sounder 20. When key 11 is raised the armature 51 of transmitter 8 moves back again, and in so doing one of the generators 48 and 49 is again connected to the line through conductor 45 for a brief instant, and a pulsation of current from this generator passes through the line, again causing the armature of relay 17 to kick, thus again operating relays 66 and 67 and deënergizing the magnet of sounder 20.

When key 9 is depressed, if the line circuit be completed through transmitter 7 to ground at $G^1$, the armatures of relays 5, 6, 3 and 2 are deflected to the right, thus placing generator 34 in the line instead of generator 33, and so reversing the current in the line and operating the polar relay 12 and sounder 13 at station B; and when key 9 is released the armatures of relays 5, 6, 3 and 2 are again deflected back to their first positions, thus restoring generator 33 to the line. If, however, key 9 is depressed while the line circuit is complete through transmitter 7 to ground at $G^2$, generators 33 and 34 being both out of the line, then when the armature 40 of relay 5 moves to the right there is an instant when the contact piece 39 is in contact both with contact point 36 and contact point 38, while the circuit of conductor 44 leading to ground at $G^2$ is broken, neither contact point 37 nor contact point 38 being in contact with its stop 43' or 43'', and during this instant one of the generators 33 and 34 is connected to the line. The armature of relay 5 is heavier than those of relays 3 and 2, so that relays 2 and 3 operate more rapidly than relay 5. Therefore at the instant when relay 5 has completed the line circuit to ground at $G^1$ relay 3 has already completed its operation and it is generator 34, and not generator 33, which is connected to the line circuit. This produces in the line a momentary pulsation of current of the direction required to operate relay 12 and therefore sounder 13, while the current is of too brief duration to affect the neutral relay 14 and is too weak to affect neutral relay 17. When key 9 is raised a similar reverse operation takes place.

There can occur no conflict in operation between transmitters 1 and 8. For, as already explained, if the armatures of relays 2 and 3 of transmitter 1 begin to move at the same time when the armature of transmitter 8 begins to move, the movement of the armatures of relays 2 and 3 will have ceased before transmitter 8 has completed the line circuit through one of the generators 48 and 49; while if key 9 be depressed after the armature of transmitter 8 begins to move the primary circuit of transmitter 1 will not be completed until the armature of transmitter 8 has ceased to move, which, however, is a time much shorter than any dot of the telegraphic code.

Fig. 7 illustrates the arrangement of the contact points of transmitters 1 and 8 which I prefer, rather than the arrangement indicated in Fig. 1. The mechanical construction of this preferred arrangement of contact points is shown in the views of the transmitter 1, Figs. 10 and 11. Instead of using pivoted contact levers 21 and 22, separate from the armature 51, I prefer to use spring contact tongues 21', 22' and 23', corresponding respectively to contact points 21, 22 and 23 of the transmitter 8 shown in Fig. 1, but carried by armature 51, though insulated therefrom. The contact point 22' is preferably carried by but insulated from the contact point 23'. Because of this arrangement of the movable contact points, the armature contact point 24' is T-shaped. This arrangement of contact points I prefer, because it is mechanically better than the arrangement shown in Fig. 1. But the arrangement of the contact points shown in Fig. 1 and employing levers for the movable contact points is perfectly practicable mechanically, and is similar to an arrangement of contact points which has been used in pole changers for many years. I prefer also to place the pulsatory current producing contact points of relay 4 upon the secondary relay rather than upon the main relay. This is also illustrated in Fig. 7. In this figure the positions of the main relay 5' and the secondary relay 6' are reversed from the position shown in Fig. 1, and the contact points of the line and ground circuits are upon the armature of the secondary relay 6'. The advantage of this is that the rate of movement of the armature of the secondary relay 6' is uniform, since the relay is controlled by but one circuit in which the current strength is uniform. The rate of movement of the armature of the main relay 5', however, varies according as to whether both the primary and tertiary circuits are energized during all the time that the armature is moving, or whether the tertiary circuit only is energized, the primary circuit being broken. The rate of movement of the armature operating the pulsatory current contact points, as well as the adjustment of the contact points, affects the length of pulses produced. If, therefore, the pulsatory current producing contact points are operated by an armature the speed of which is variable, the length of pulse will vary. Such variation of the length of pulse produced by the contact points is obviated by causing these contact points to be operated by the secondary relay rather than by the main relay.

In Fig. 7 the pulsatory current producing contact points of relay 4 are arranged in the same manner as the similar contact points of transmitter 8. Fig. 7 also illustrates the arrangement of the circuits where the neutral single current transmitter 7 operates upon the normally open rather than the normally closed principle. The armature of transmitter 7 is connected to the contact points 37' and 38' of relay 6', and the contact stop 42 is connected to the armature of relay 3 and also to the contact point 36'. When transmitter 7 operates, therefore, it throws one of the generators 33 or 34 into the line, instead of throwing it out of the line, as is the case in the arrangement of circuits shown in Fig. 1.

In Fig. 8 I have illustrated diagrammatically the complete arrangement of transmitting and receiving instruments for one end of a sextuplex line, the receiving instruments being duplexed according to the Stearns differential duplex system. The transmitting station is lettered A, and the receiving station, since it corresponds to a transmitting station at the other end of the line similar to A, is lettered B'. The transmitting instruments and their circuits are the same as those shown in Fig. 1, except that the arrangement of the pulsatory current producing contact points of the polar relay 4 of transmitter 1, and of transmitter 8, is that shown in Fig. 7, transmitter 7 being arranged, as in Fig. 1, to operate on the normally closed circuit plan. The receiving instruments and circuits of station B' are the same as those of station B, Fig. 2, except that relays 12, 14 and 17 are differentially wound for the line and artificial line circuits of the Stearns duplex system. L is the line conductor, and L' the artificial line conductor, said conductors passing through differentially-wound coils of relays 17, 14 and 12, so that signals in the line circuit from any of the transmitters at the same end of the line are counterbalanced by the similar signals in the artificial line L'.

The use of similar but oppositely placed dynamos, such as 33 and 34, and 48 and 49, in pairs, in connection with a two point relay, such as 3, is a familiar expedient for obtaining reversal of the current without short-circuiting the dynamos. Such pairs of dynamos each form the equivalent of a single generating element, in a telegraph system in which they are used, and are so to be considered in the claims which follow.

It is not essential to use two independent generators of different strengths for operating the neutral pulsatory and the polar pulsatory sides of my system. Instead, the current for operating the different receiving instruments may all be derived from one generator. This may be done conveniently by regulating the length of the pulses, employing a generator capable of giving a current of the maximum strength required, and adjusting the contact points of the polar pulsatory current transmitter so that the pulse produced thereby shall be so short that the current strength in the line shall not reach a sufficient strength, during the pulse, to operate the neutral double current receiving instrument.

In Fig. 9 I have shown a neutral pulsatory current transmitter and a polar pulsatory current transmitter so combined, and drawing their current from one set of generators, 48 and 49. The contact points of the relay 6' of transmitter 1, the polar transmitter, are so adjusted that the pulsation of current sent through the line, when they operate, is so brief that the current strength in the line does not rise sufficiently high to operate a receiving instrument corresponding to transmitter 8, the neutral pulsatory current transmitter; while the contact points of transmitter 8 are arranged to produce a longer pulsation of current when operated.

In all of the diagrams of this application the contact points of the pulsatory-current transmitters are to be understood to be capable of adjustment for regulating the length of the pulse. This may be accomplished most readily by employing screws for the stops 25', 25'', 43', and 43'', as is the practice in pole changers which these instruments resemble in the arrangement of their contact points. It is desirable, in operating the system, to employ as short pulsations as can be depended on to operate the various receiving instruments. It is of course possible to use much shorter pulses of current on a short line, in which the current quickly rises to its full value, than on a longer line, in which the current rises to its full value much more slowly.

In Figs. 10 and 11 I have shown in plan and in elevation the polar pulsatory current transmitter 4' shown diagrammatically in Fig. 7. 2, 3, and 5' are ordinary polar relays, and 6' is also a polar relay of a familiar type, though of a type different from that of relays 2, 3, and 5'. The particular type of polar relay adopted, however, is not material, except as the selection of the most fitting type for each use affects the efficiency of operation. In the elevation, Fig. 11, the mechanical construction of the preferred arrangement of pulsatory current producing contact points is shown. One end of the armature lever 63' is T-shaped. The contact points 36' and 38' are thin strips of springy metal, secured to the lever 63', but insulated therefrom by pieces of vulcanite or fiber. Their ends lie within the branches of the T-shaped end of the lever, which branches serve also as contact points coacting with the spring contact points 36' and 38'. Contact point 37' is a thin piece of metal, carried by, but insulated from, contact point 36'. The adjustability of the contact stops 43' and 43'' is also shown. These stops are screws, mounted in blocks 90 and 91 which themselves are movably mounted upon a post 92, and may be moved up and down by means of a milled head 93 and suitable screws and springs. At the opposite end of the lever 63' are two other contact points, 94 and 95, engaging the armature, for the tertiary circuit of the instrument. This end of the armature is insulated from the other end by vulcanite or fiber, as shown.

In Figs. 10 and 11, the terminal binding posts for the various circuits external to transmitter 1, are indicated by the numerals of the circuits or instruments to which they are to be connected, with the letter "a" added.

In Fig. 12 I have shown an elevation, and in Fig. 13 a plan of the neutral double current receiving instrument 18, shown diagrammatically in Fig. 2. It consists of two ordinary polar relays 66 and 67, the magnets, however, being connected in the manner shown in Fig. 3 so as to make them dead beat relays, and a neutral relay 17.

In the following claims I have designated the method by which transmitter 7 operates (this being the ordinary or Morse method of transmission) as the "single current" method, this being the term usually applied to it, as distinguished from the polar or double current method of transmission. I have also employed the term "polar double current" method of transmission as referring to the current reversing method broadly, by which transmitter 1 operates, and have employed the term "polar pulsatory current" method to designate the method of transmission by which transmitter 1 operates when used in connection with a neutral single current transmitter. I have further employed the term "neutral double current" method of transmission to designate broadly the method by which transmitter 8 operates, and have employed the term "neutral pulsatory current" method to designate the method of transmission by which transmitter 8 operates when used in connection with a neutral single current transmitter.

Having thus completely described my invention, what I claim and desire to secure by Letters Patent is:—

1. In a telegraph system, the combination with a line conductor, means for supplying current to the line, and a double current transmitting instrument having contact points through which the line circuit passes, adapted, when operated, to produce in the line a current impulse at the beginning and again at the end of each signal of the transmitter, of a neutral double current receiving instrument corresponding to said transmitting instrument and adapted to be changed from and restored to normal condition by alternate current impulses in the line.

2. In a telegraph system, the combination, with a line conductor, a generator for supplying current to the line, and a double current transmitting instrument having contact points arranged, when operated, to place said generator to the line at the beginning and again at the end of each signal of the transmitter, of a neutral double current receiving instrument corresponding to said transmitting instrument and adapted to be changed from, and restored to, normal condition by alternate currents in the line.

3. In a telegraph system, the combination, with a line conductor, means for supplying current to the line, and a pulsatory current transmitting instrument having contact points through which the line circuit passes, adapted, when operated, to produce in the line, at the beginning and again at the end of each signal of the transmitter, a brief pulsation of current, of a neutral pulsatory current receiving instrument corresponding to said transmitting instrument and adapted to be changed from, and restored to, normal condition by alternate current pulsations in the line.

4. In a telegraph system, the combination, with a line conductor, a generator for supplying current to the line, and a pulsatory current transmitting instrument having contact points arranged, when operated, to place said generator to the line, momentarily, at the beginning and again at the end of each signal of the transmitter, each time producing therein a brief pulsation of current, of a neutral pulsatory current receiving instrument corresponding to said transmitting instrument and adapted to be changed from, and restored to, normal condition by alternate current pulsations in the line.

5. In a telegraph system, the combination, with a line conductor, means for supplying currents of two different strengths to the line, a polar double current transmitter arranged, when operated, to produce in the line at the beginning and again at the end of each of its signals, a weaker current impulse, and a neutral double current transmitter adapted, when operated, to produce in the line at the beginning and again at the end of each of its signals a stronger current impulse, of the direction determined by the polar transmitter, of a polar receiving instrument operated by the reversed current impulses produced by the polar transmitter, and a neutral double current receiving instrument which is changed from, and restored to, normal condition by alternate impulses of said stronger current.

6. In a telegraph system, the combination, with a line conductor, means for supplying to the line currents of two different strengths, a polar double current transmitter arranged, when operated, to reverse the direction of both of said currents, and a neutral double current transmitter adapted, when operated, to produce an impulse of said stronger current in the line at the beginning and again at the end of each signal, of a polar receiving instrument operated by the reversal of said currents, and a neutral double current receiving instrument which is changed from, and restored to, normal condition, by alternate impulses of said stronger current.

7. In a telegraph system, the combination, with a line conductor, means for supplying to the line currents of two different strengths, a polar double current transmitter arranged, when operated, to reverse the direction of both of said currents, and a neutral double current transmitter having contact points through which the line circuit passes, adapted, when operated, to produce an impulse of said stronger current in the line at the beginning and again at the end of each signal, of a polar receiving instrument operated by the reversal of said currents, and a neutral double current receiving instrument which is changed from, and restored to, normal condition, by alternate impulses of said stronger current.

8. In a telegraph system, the combination, with a line conductor, two electric generators of different strengths, a polar double current transmitter arranged, when operated, to reverse the current of said generators, and a neutral double current transmitter having contact points arranged to place the stronger generator to the line at the beginning and again at the end of each signal, of a polar receiving instrument operated by the reversal of the currents of said generators, and a neutral double current receiving instrument corresponding to said neutral transmitting instrument, and adapted to be changed from, and restored to, normal condition by alternate impulses of said stronger current.

9. In a telegraph system, the combination, with a line conductor, means for supplying to the line currents of two different strengths, a single current transmitter controlling the weaker of said currents, and a receiving instrument operated by variations in the line current produced thereby, of a pulsatory current transmitter adapted, when operated, to produce in the line at the beginning and again at the end of each signal, a pulsation of said stronger current of too brief duration to operate the receiving instrument corresponding to the single current transmitter, and a neutral pulsatory current receiving instrument adapted to be changed from, and restored to, normal condition by alternate pulsations of said stronger current, but to be unaffected by variations of said weaker current.

10. In a telegraph system, the combination, with a line conductor, means for supplying to the line currents of two different strengths, a single current transmitter controlling the weaker of said currents, and a receiving instrument operated by variations in the line current produced thereby, of a pulsatory current transmitter having contact points through which the line circuit passes adapted, when operated, to produce in the line at the beginning and again at the end of each signal a pulsation of said stronger current of too brief duration to operate the receiving instrument corresponding to the current varying transmitter, and a neutral pulsatory current receiving instrument adapted to be changed from, and restored to, normal condition by alternate pulsations of said stronger current, but to be unaffected by variations of said weaker current.

11. In a telegraph system, the combination with a line conductor, two electric generators of different strengths, a single current transmitter controlling the current of the weaker of said generators, and a receiving instrument operated by variations in the line current produced thereby, of a pulsatory current transmitter having contact points arranged to throw the stronger generator into the line circuit at the beginning and again at the end of each signal for a brief instant, thereby producing in the line a pulsation of said stronger current of too brief duration to operate the receiver corresponding to said single current transmitter, and a neutral pulsatory current receiving instrument corresponding to said pulsatory current transmitter and arranged to be changed from, and restored to, normal condition by alternate pulsations of said stronger current, but to be unaffected by variations of said weaker current.

12. In a telegraph system, the combination, with a line conductor, means for supplying to the line currents of different strengths, a single current transmitter controlling a weaker current, a neutral pulsatory current transmitter adapted, when operated, to place a stronger current to the line at the beginning and again at the end of each signal, momentarily, thereby producing in the line a brief pulsation of said stronger current, and a polar double current transmitter adapted, when operated, to reverse the direction of said currents, of a neutral receiving instrument operated by the variations in the line current produced by the single current transmitter, a neutral pulsatory current receiving instrument adapted to be changed from, and restored to, normal condition by alternate pulsations of said stronger current, but to be unaffected by variations of said weaker current, and a polar receiving instrument operated by the reversal of said currents.

13. In a telegraph system, the combination, with a line conductor, means for supplying to the line currents of different strengths, a single current transmitter controlling a weaker current, a neutral pulsatory current transmitter having contact points through which the line circuit passes, adapted, when operated, to place a stronger current in the line at the beginning and again at the end of each signal, thereby producing in the line a brief pulsation of said stronger current, and a polar double current transmitter adapted, when operated, to reverse the direction of said currents, of a neutral receiving instrument operated by variations in the line current produced by said single current transmitter, a neutral pulsatory current receiving instrument adapted to be changed from, and restored to, normal condition by alternate pulsations of said stronger current, but to be unaffected by variations of said weaker current, and a polar receiving instrument operated by the reversal of said currents.

14. In a telegraph system, the combination, with a line conductor, a plurality of electric generators of different strengths, a single current transmitter controlling the current of a weaker generator, a neutral pulsatory current transmitter having contact points arranged, when operated, to place a stronger generator to the line at the beginning and again at the end of each signal, momentarily, thereby producing in the line a brief pulsation of stronger current, and a polar double current transmitter adapted, when operated, to reverse the polarity of said generators with respect to the line, of a neutral receiving instrument operated by the variations in the line current produced by the single current transmitter, a neutral pulsatory current receiving instrument adapted to be changed from, and restored to, normal condition by alternate pulsations of said stronger current, but to be unaffected by variations of said weaker current, and a polar receiving instrument operated by the reversal of the currents of said generators.

15. In a telegraph system, the combination, with a line conductor, means for supplying to the line currents of different strengths, a single current transmitter controlling a weaker current, a neutral pulsatory current transmitter adapted, when operated, to produce in the line, at the beginning and again at the end of each signal, a brief pulsation of said stronger current, and a polar pulsatory current transmitter adapted, when operated while the currents of the single current and neutral pulsatory current transmitters are out of line, to place to the line, for a brief instant, a weaker current, and adapted also, when operated, to reverse the direction of said stronger and weaker currents, of a neutral receiving instrument operated by the variations in the line current produced by the single current transmitter, a neutral pulsatory current receiving instrument adapted to be changed from, and restored to, normal condition by alternate pulsations of said stronger current, but to be unaffected by variations of weaker currents, and a polar receiving instrument operated by the reversal of the direction of said currents.

16. In a telegraph system, the combination, with a line conductor, means for supplying current to the line at each end thereof, and a double current transmitter at each end of the line having contact points through which the current for that end of the line passes, adapted when operated, to produce in the line a current impulse at the beginning and again at the end of each signal of the transmitter, of a neutral double current receiving instrument at each end of the line adapted to be changed from, and restored to, normal condition by alternate current impulses in the line, and means for counteracting the effect of the outgoing messages at each end of the line upon the receiving instrument there located.

17. In a telegraph system, the combination, with a line conductor, an artificial line circuit at each end of the line, means for supplying current to the line at each end thereof and to the artificial line there located, and a double current transmitter at each end of the line having contact points through which the current for that end of the line passes, adapted, when operated, to produce in the line and local artificial line a current impulse at the beginning and again at the end of each signal of the transmitter, of a neutral double current receiving instrument at each end of the line adapted to be changed from, and restored to, normal condition by alternate current impulses in the line, and arranged to be acted upon oppositely by the line and local artificial line circuits, whereby the effect on each receiving instrument of the outgoing messages at its end of the line is neutralized.

18. In a telegraph system, the combination, with a line conductor, a generator for supplying current to the line at each end thereof, and a double current transmitter at each end of the line having contact points arranged, when operated, to place the local generator to the line at the beginning and again at the end of each signal of the transmitter, of a neutral double current receiving instrument at each end of the line adapted to be changed from, and restored to, normal condition by alternate current impulses in the line, and means for counteracting the effect of the outgoing messages at each end of the line upon the receiving instrument there located.

19. In a telegraph system, the combination, with a line conductor, an artificial line circuit at each end of the line, a generator for supplying current to the line at each end thereof, and to the artificial line there located, and a double current transmitter at each end of the line having contact points arranged, when operated, to place the local generator to the line and local artificial line at the beginning and again at the end of each signal of the transmitter, of a neutral double current receiving instrument at each end of the line adapted to be changed from, and restored to, normal conditions by alternate current impulses in the line, and arranged to be acted upon oppositely by the line and local artificial line circuits, whereby the effect on each receiving instrument of the outgoing messages at its end of the line is neutralized.

20. In a telegraph system, the combination, with a line conductor, means for supplying to the line, at each end thereof, currents of two different strengths, a polar double current transmitter at each end of the line controlling the direction of the current for its end of the line, and a neutral double current transmitter at each end of the line adapted, when operated, to produce in the line at the beginning and again at the end of each of its signals an impulse of the stronger current of the direction determined by the polar transmitter, of a polar double current receiving instrument at each end of the line, operated by reversal of current, a neutral double current receiving instrument at each end of the line adapted to be changed from, and restored to, normal condition by alternate impulses of said stronger current, and means for counteracting the effect of the outgoing messages at each end of the line upon the receiving instruments there located.

21. In a telegraph system, the combination, with a line conductor, an artificial line circuit at each end of the line, means for supplying to the line at each end thereof, and to the artificial line there located, currents of two different strengths, a polar double current transmitter at each end of the line controlling the direction of the current for its end of the line, and a neutral double current transmitter at each end of the line adapted, when operated, to produce in the line and local artificial line, at the beginning and again at the end of each of its signals, an impulse of the current of the direction determined by the polar transmitter, of a polar double current receiving instrument at each end of the line operated by reversal of current, and a neutral double current receiving instrument at each end of the line adapted to be changed from, and restored to, normal condition by alternate impulses of said stronger current, said receiving instruments being arranged to be acted upon oppositely by the line and local artificial line circuits, whereby the effect on each receiving instrument of the outgoing messages at its end of the line is neutralized.

22. In a telegraph system, the combination, with a line conductor, means for supplying to the line, at each end thereof, currents of two different strengths, a single current transmitter at each end of the line controlling the weaker of said currents, and a single current receiving instrument at each end of the line adapted to be operated by variations in the line current produced by the operation of the single current transmitter at the opposite end of the line, of a neutral pulsatory current transmitter at each end of the line controlling the stronger of said currents and adapted when operated to produce in the line a pulsation, of said stronger current of too brief duration to operate the single current receiving instruments, a neutral pulsatory current receiving instrument at each end of the line adapted to be changed from, and restored to, normal condition by alternate pulsations of said stronger current in the line, but to be unaffected by variations of said weaker current, and means for counteracting the effect of the outgoing messages at each end of the line upon the receiving instruments there located.

23. In a telegraph system, the combination, with a line conductor, an artificial line circuit at each end of the line, means for supplying to the line, at each end thereof, and to the artificial line there located, currents of two different strengths, a single current transmitter at each end of the line controlling the weaker of said currents, and a single current receiving instrument at each end of the line adapted to be operated by variations in the line current produced by the operation of the single current transmitter at the opposite end of the line, of a neutral pulsatory current transmitter at each end of the line controlling the stronger of said currents, and adapted when operated to produce in the line and local artificial line a pulsation of said stronger current of too brief duration to operate the single current receiving instruments, and a neutral pulsatory current receiving instrument at each end of the line adapted to be changed from, and restored to, normal condition by alternate pulsations of said stronger current in the line, but to be unaffected by variations of said weaker current, said receiving instruments being arranged to be acted upon oppositely by the line and local artificial line circuits, whereby the effect on each receiving instrument of the outgoing messages at its end of the line is neutralized.

24. In a telegraph system, the combination, with a line conductor, means for supplying to the line, at each end thereof, currents of different strengths, a single current transmitter at each end of the line controlling a weaker current, a neutral pulsatory current transmitter at each end of the line adapted when operated to produce in the line a brief pulsation of a stronger current at the beginning and again at the end of each of its signals, and a polar double current transmitter at each end of the line, controlling the direction of the current from its end of the line, of a single current receiving instrument at each end of the line adapted to be operated by the variations in the line current produced by the operation of the single current transmitter at the opposite end of the line, a neutral pulsatory current receiving instrument at each end of the line adapted to be changed from, and restored to, normal condition by alternate pulsations of said stronger current in the line, but to be unaffected by variations of said weaker current, a polar receiving instrument at each end of the line, operated by reversal of current, and means for counteracting the effect of the outgoing messages at each end of the line upon the receiving instruments there located.

25. In a telegraph system, the combination, with a line conductor, an artificial line circuit at each end of the line, means for supplying to the line at each end thereof, and to the artificial line there located, currents of different strengths, a single current transmitter at each end of the line controlling a weaker current, a neutral pulsatory current transmitter at each end of the line adapted when operated to produce in the line and local artificial line a brief pulsation of a stronger current at the beginning and again at the end of each of its signals, and a polar double current transmitter at each end of the line, controlling the direction of the current for its end of the line, of a single current receiving instrument at each end of the line adapted to be operated by the variations in the line current produced by the operation of the single current transmitter at the opposite end of the line, a neutral pulsatory current receiving instrument at each end of the line adapted to be changed from, and restored to, normal condition by alternate pulsations of said stronger current in the line, but to be unaffected by variations of said weaker current, and a polar receiving instrument at each end of the line operated by reversal of current, said receiving instruments being arranged to be acted upon oppositely by the line and local artificial line circuits, whereby the effect on each receiving instrument of the outgoing messages at its end of the line is neutralized.

26. In a telegraph system, the combination, with an electrically controlled pole changing transmitter, of a neutral transmitter arranged to operate slowly as compared with the pole changing transmitter, and having contacts which are complete when the armature is at rest but are broken when the armature is moving, and a local circuit for operating said pole changing transmitter, passing through said contacts of the neutral transmitter, whereby interference with the signals of either transmitter by the other is avoided.

27. In a telegraph system, the combination, with an electrically controlled pole changing transmitter and a neutral transmitter having an armature lever which is heavy as compared with the armature lever of the pole changing transmitter and having contacts which are complete when said lever is at rest but are broken when the lever is in motion, of a local circuit for operating the pole changing transmitter passing through said contacts of the neutral transmitter, whereby interference with the signals of either transmitter by the other is avoided.

28. In a telegraph system, the combination, with an electrically controlled pole changing transmitter having the local circuits, contacts, and circuit reversing devices of a polar pulsatory current relay, of a neutral transmitter arranged to operate slowly as compared with the pole changing transmitter and having contacts, through which the primary or controlling circuit of the pole changing transmitter passes, which are complete when the armature is at rest but are broken when the armature is in motion, whereby interference with the signals of either transmitter by the other is avoided.

29. In a telegraph system, the combination, with an electrically controlled pole changing transmitter having the local circuits, contacts, and circuit reversing devices of a polar pulsatory current relay, of a neutral transmitter having an armature lever which is heavy as compared with the armature lever of the pole changing transmitter and having contacts, through which the primary or controlling circuit of the pole changing transmitter passes, which are complete when the armature is at rest but are broken when the armature is in motion, whereby interference with the signals of either transmitter by the other is avoided.

30. In a telegraph system, the combination, with an electrically controlled pole changing transmitter having a primary or controlling circuit, a secondary circuit normally assisting the primary circuit and passing through contacts which are broken when the armature of the transmitter is moving, a tertiary circuit normally opposing the primary and secondary circuits, but weaker than the secondary circuit, means for reversing the primary circuit to operate the transmitter, and means for reversing the secondary and tertiary circuits successively when the transmitter operates, of a neutral transmitter arranged to operate slowly as compared with the pole changing transmitter, and having contacts, through which the primary circuit of the pole changing transmitter passes, which are complete when the armature is at rest but are broken when said armature is in motion, whereby interference with the signals of either transmitter by the other is avoided.

31. In a transmitter, the combination, with a contact piece or point, movably mounted, and means for operating the same, of two continuity-preserving contact points on opposite sides of said movable contact piece, adapted to make electrical contact therewith, electrically connected stops for said continuity-preserving contact points arranged to permit one continuity-preserving contact point to make contact with the movable contact piece before the other breaks contact therewith, one of said continuity-preserving contact points being insulated from its stop, and a contact point arranged to move with said last-named continuity-preserving contact point and to make electrical connection with said stops, and electrically connected with the opposite continuity-preserving contact.

32. In a neutral instrument adapted to be operated by double or successive impulses, the combination, with a secondary relay having a movably mounted armature, secondary and tertiary circuits passing through magnet coils of the relay, the secondary circuit tending to hold the armature stationary and the tertiary circuit tending to reverse its position, means for supplying current to said circuits, and circuit controlling devices controlling said circuits and adapted when the position of the armature is reversed to reverse the action of the secondary and tertiary circuits successively, of a primary or actuating relay, arranged, when operated, to interrupt the secondary circuit, thereby permitting the tertiary circuit to reverse the position of the armature of said secondary relay.

33. In a neutral instrument adapted to be operated by double or successive impulses, the combination, with a secondary relay having a movably mounted armature, secondary and tertiary circuits passing through magnet coils of the relay, the secondary circuit tending to hold the armature stationary and the tertiary circuit tending to reverse its position, means for supplying current to said circuits contact points, operated by said armature, and controlling the action of the secondary circuit, and adapted to reserve the action of the secondary circuit when the position of the armature is reversed, and means for reversing the action of the tertiary circuit after the action of the secondary circuit has been reversed, of a primary or actuating relay, arranged, when operated, to interrupt the secondary circuit, thereby permitting the tertiary circuit to reverse the position of the armature of said secondary relay.

34. In a neutral instrument adapted to be operated by double or successive impulses, the combination, with a secondary relay having a movably mounted armature, secondary and tertiary circuits passing through magnet coils of the relay, the secondary circuit tending to hold the armature stationary and the tertiary circuit tending to reverse its position, means for supplying current to said circuits, contact points, operated by said armature, and controlling the action of the secondary circuit, and adapted to reverse the action of said secondary circuit when the position of the armature is reversed, and a reversing relay operated by said secondary circuit and controlling the tertiary circuit when the action of the secondary circuit is reversed, of a primary of actuating relay, arranged, when operated, to interrupt the secondary circuit, thereby permitting the tertiary circuit to reverse the position of the armature of said secondary relay.

35. In a neutral instrument, adapted to be operated by double or successive impulses, the combination, with a secondary relay having a movably mounted armature, opposing magnets for said armature, secondary and tertiary circuits for each of said magnets and means for supplying current thereto, the secondary circuit of each magnet passing through a contact of said relay which is closed when the armature is in proximity to said magnet, and a reversing relay controlled by said secondary circuits and controlling the tertiary circuits, and arranged to complete that tertiary circuit which opposes the secondary circuit energized at any instant, of a primary or actuating relay having contact points through which the secondary circuits pass, arranged to interrupt said secondary circuits when the relay is operated, thereby permitting the tertiary circuit then energized to reverse the position of the armature of the secondary relay.

36. The method of transmitting simultaneous telegraphic messages in the same direction through a single circuit, which consists in transmitting one message by the single current method of transmission, and a second message by the herein described neutral pulsatory current method of transmission, employing current pulsations occuring in pairs and without necessary change in direction, which produce a current strength different from that produced in the transmission of signals by the single current method, and are of too brief duration to interfere with such single current transmission.

37. The method of transmitting simultaneous telegraphic messages in the same direction through a single circuit, which consists in transmitting one message by the polar double current method of transmission, and a second message by the herein described neutral double current method of transmission, employing current impulses occurring in pairs and without necessary change in direction, which produce a current different from that employed in the transmission by the polar method alone.

38. The method of transmitting simultaneous telegraphic messages in the same direction through a single circuit, which consists in transmitting one message by the polar pulsatory current method of transmission, and a second message by the herein described neutral pulsatory current method of transmission, employing current impulses occurring in pairs and without necessary change in direction, which produce a current strength different from that produced by the impulses employed in the transmission by the polar method alone.

39. The method of transmitting simultaneous telegraphic messages in the same direction through a single circuit, which consists in transmitting one message by the single current method of transmission, a second message by the polar double current method of transmission, and a third message by the herein described neutral pulsatory current method of transmission, employing current impulses occurring in pairs and without necessary change in direction which produce a current strength different from that produced in the transmission of signals by the single current and polar double current methods alone, and of too brief duration to interfere with the single current transmission.

40. The method of transmitting simultaneous telegraphic messages in the same direction through a single circuit, which consists in transmitting one message by the single current method of transmission, a second message by the polar pulsatory current method of transmission, and a third message by the herein described neutral pulsatory current method of transmission, the current impulses employed in said polar and neutral pulsatory current methods being of too brief duration to interfere with the single current transmission and the current impulses employed in the neutral pulsatory current method occurring in pairs and without necessary change in direction and producing a current strength different from that produced in the transmission of signals by the single and polar current methods of transmission.

41. The method of transmitting simultaneous telegraphic messages in opposite directions through a single circuit, which consists in transmitting one message in each direction by the single current method of transmission, and a second message by the herein described neutral pulsatory current method of transmission, employing current pulsations occurring in pairs and without necessary change in direction, which produce a current strength different from that produced in the transmission of signals by the single current method, and are of too brief duration to interfere with such single current transmission, and in counteracting the effect of the outgoing messages at each end of the line upon the receiving instruments there located by means of a method of duplex telegraphy.

42. The method of transmitting simultaneous telegraphic messages in opposite directions through a single circuit, which consists in transmitting one message in each direction by the polar double current method of transmission, and a second message by the herein described neutral double current method of transmission, employing current impulses occurring in pairs and without necessary change in direction, which produce a current strength different from that employed in the transmission by the polar method alone, and in counteracting the effect of the outgoing messages at each end of the line upon the receiving instruments there located by means of a method of duplex telegraphy.

43. The method of transmitting simultaneous telegraphic messages in opposite directions through a single circuit, which consists in transmitting one message in each direction by the polar pulsatory current method of transmission, and a second message by the herein described neutral pulsatory current method of transmission, employing current impulses occurring in pairs and without necessary change in direction, which produce a current strength different from that produced by the impulses employed in the transmission by the polar method alone, and in counteracting the effect of the outgoing messages at each end of the line upon the receiving instruments there located by means of a method of duplex telegraphy.

44. The method of transmitting simultaneous telegraphic messages in opposite directions through a single circuit, which consists in transmitting one message in each direction by the neutral single current method of transmission, a second message by the polar double current method of transmission, and a third message by the herein described neutral pulsatory current method of transmission, employing current impulses occurring in pairs and without necessary change in direction, which produce a current strength different from that produced in the transmission of signals by the single current and polar double current methods alone, and of too brief duration to interfere with the single current transmission, and in counteracting the effect of the outgoing meassges at each end of the line upon the receiving instruments there located by means of a method of duplex telegraphy.

45. The method of transmitting simultaneous telegraphic messages in opposite directions through a single circuit, which consists in transmitting one message in each direction by the single current method of transmission, a second message by the polar pulsatory current method of transmission, and a third message by the herein described neutral pulsatory current method of transmission, the current impulses employed in such polar and neutral pulsatory current methods of transmission being of too brief duration to interfere with the single current methods of transmission, and the impulses employed in the neutral pulsatory current method occurring in pairs and without necessary change in direction, and producing a current strength different from that produced in the transmission of signals by the single current and polar pulsatory current transmission.

46. The herein described neutral double current method of transmitting telegraphic messages, which consists in transmitting dot and dash signals by current impulses in pairs and without necessary change in direction, but independent of the direction of the current, the interval between the impulses of a pair being longer in the case of a dash than in the case of a dot.

In testimony whereof I affix my signature, in the presence of two witnesses.

THOMAS BULLITT DIXON.

Witnesses:
H. M. MARBLE,
MINERVA P. BURNET.